(12) United States Patent
Levert et al.

(10) Patent No.: US 6,648,271 B2
(45) Date of Patent: Nov. 18, 2003

(54) DEVICE FOR RECOVERY OF FORCES GENERATED BY AN AIRCRAFT ENGINE

(75) Inventors: Stéphane Levert, Toulouse (FR); Sébastien Roszak, Toulouse (FR)

(73) Assignee: Airbus France, Cedex (FR)

( * ) Notice: Subject to any disclaimer, the term of this patent is extended or adjusted under 35 U.S.C. 154(b) by 0 days.

(21) Appl. No.: 10/165,563

(22) Filed: Jun. 7, 2002

(65) Prior Publication Data
US 2003/0173456 A1 Sep. 18, 2003

(30) Foreign Application Priority Data
Jun. 13, 2001 (FR) .............................. 01 07728

(51) Int. Cl.⁷ .............................................. B64D 27/00
(52) U.S. Cl. ......................................... 244/54; 248/554
(58) Field of Search .......................... 244/54; 60/796, 60/797; 248/554, 555, 556, 557

(56) References Cited

U.S. PATENT DOCUMENTS

| 4,037,809 A | * | 7/1977 | Legrand | |
| 4,725,019 A | * | 2/1988 | White | |
| 4,920,744 A | * | 5/1990 | Garcia et al. | |
| 5,275,357 A | | 1/1994 | Seelen et al. | 244/54 |
| 5,443,229 A | * | 8/1995 | O'Brien et al. | |
| 5,620,154 A | | 4/1997 | Hey | 244/54 |
| 5,921,500 A | * | 7/1999 | Ellis et al. | |
| 5,927,644 A | * | 7/1999 | Ellis et al. | |
| 6,059,227 A | | 5/2000 | Le Blaye et al. | 244/54 |
| 6,189,830 B1 | * | 2/2001 | Schnelz et al. | |
| 6,474,597 B1 | * | 11/2002 | Cazenave | |

FOREIGN PATENT DOCUMENTS

| EP | 0 257 665 | 6/1987 | ........... B64D/27/26 |
| EP | 1 031 507 | 1/2000 | ........... B64C/27/26 |
| GB | 2061389 | * 5/1981 | ................... 244/54 |

* cited by examiner

Primary Examiner—Tien Quang Dihn
(74) Attorney, Agent, or Firm—Thelen Reid & Priest LLP; Robert E. Krebs

(57) ABSTRACT

A device for recovering forces generated by an aircraft engine has an engine strut (10), capable of being fixed to a wing or a fuselage of an aircraft, and an attachment device (12) fixed to the engine strut (10) and on which the engine is mounted. An intermediate fitting (24) of large dimensions, capable of recovering exceptionally high forces is fixed to several strut fittings (30) independent from each other, for example by bolts (28), across a lower spar (14) of the engine strut (10).

5 Claims, 2 Drawing Sheets

DEVICE FOR RECOVERY OF FORCES GENERATED BY AN AIRCRAFT ENGINE

TECHNICAL FIELD

The present invention relates to a device designed to recover the forces generated by an aircraft engine, in order to retransmit them to a structure of the aircraft, such as a wing or fuselage element, by means of an engine strut.

More precisely, the invention relates to a device intended to recover the engine couple together with the forces produced by the engine along lateral and vertical directions relative to a longitudinal axis of the engine.

STATE OF THE ART

Engines equipping aircraft are suspended under the wing or attached laterally onto the fuselage by means of an engine strut.

The connection between the engine and the engine strut is ensured by systems generally constituted of two or three supplementary attachment devices, each fulfilling a certain function.

Documents U.S. Pat. No. 5,620,154, U.S. Pat. No. 5,275,357 and U.S. Pat. No. 6,059,227 describe the different attachment devices existing at present. Each of these devices comprises a principle attachment structure and an emergency attachment structure. The principal attachment structure ensures transmission of forces during normal operation, that is when all the parts of the attachment device are intact. The emergency attachment structure is provided to ensure continuity of the function of transmission of effort between the engine and the aircraft in the event of rupture of one of the parts of the principle attachment structure.

The existing attachment devices, such as those shown in the documents named above, usually comprise an intermediate fitting, fixed to the engine strut, for example by means of screws, and at least two ball pivoted rods, ensuring the connection between the fitting and the engine. The ball pivot mounting of the rods on the fitting and on the engine makes it possible to prevent the structure continuing forces along the longitudinal axis of the engine.

Existing attachment devices are fixed on the one hand to the engine and on the other hand to the engine strut. The latter constitutes the connection interface between the propulsive assembly, constituted by the engine and the pod surrounding it, and the structure of the aircraft, constituted by the wings or the fuselage.

More precisely, the engine strut enables the forces generated by the engine to be transmitted to the plane. It also ensures the supply of fuel, electricity, hydraulics and air between the engine and the aircraft. Furthermore, it has to withstand various stresses such as aerodynamic drag, minimum mass and cost for maximum safety.

Usually, an engine strut comprises two sub-assemblies formed by a primary structure and a secondary structure, together with equipment.

The primary structure of the engine strut is constituted of a framework and lateral panels. It ensures the transmission of the forces exerted by the engine to the structure of the aircraft. For this reason, its rigidity must be high.

The secondary structure of the engine strut comprises all metallic shell elements added to the primary structure. These elements fulfil different functions such as aerodynamic functions (in order to limit the drag due to the engine strut), protection functions and separation functions for the systems crossing the engine strut, functions of accessibility to the primary structure elements etc.

On modern planes, the primary structure of the engine strut is of the "box" type. It comprises a lower spar, an upper front spar, an upper rear spar, ribs for connecting said spars and lateral panels enclosing the engine strut. In certain cases, an intermediate fitting is set between the attachment device of the engine and the engine strut. It is generally fixed on one of the fittings by four bolts.

In this known arrangement, the forces generated by the engine are transmitted from the intermediate fitting to the strut box and then to the wing or the fuselage through the four bolts, the rib and the lateral panels of the engine strut. The rib fulfils the function of stabilising the lateral panels stressed in traction and compression.

When using an engine generating greater forces than existing planes, such as an engine with a greater weight and level of propulsive thrust relative to existing engines, all the active elements of the attachment device of the engine and the, engine strut must be able to recover these forces and transmit them to the wing or to the fuselage.

In order to take up the forces generated by the increase in mass and the level of propulsive thrust of new engines, it is necessary to increase the number of fixations between the strut and the attachment device of the engine. The number of fixations can be doubled, for example. Resulting from this increase, one can increase the size of the fitting receiving these fixations and make it more rigid., This can then lead to increasing the dimensions of the rib of the engine strut through which the forces are usually transmitted to the wing or the fuselage, to take into account the change in dimensions of the intermediate fitting and the increase in the thrusts to be recovered.

However, the large dimensions then required of the rib could lead to serious problems. The machining of a part of such large dimensions is difficult and very long since machining has to take place in the mass. Furthermore, such a part is heavy, bulky and costly. In addition, it is difficult to mount. Finally, the forces. transit the whole of the fitting and thus do not have any privileged path. This requires using a totally rigid fitting, to avoid problems of cracks and breaks, which increases the mass even further.

DESCRIPTION OF THE INVENTION

The precise aim of the invention is a device for recovering forces generated by an aircraft engine, with an original design making it possible to simplify its machining and mounting, and to limit its weight, its bulk and its cost, when the size of the engine leads to an increase in the dimensions of the intermediate fitting.

According to the invention, this result is obtained by means of a device for recovering the forces generated by an aircraft engine, comprising an engine strut able to be fixed to a structure of the aircraft and at least one attachment device fixed to the engine strut and capable of supporting the engine, the attachment device comprising an intermediate fitting fixed to the strut by first fixation means, characterised in that the engine strut comprises, facing the attachment device, several strut fittings independent from each other, the intermediate fitting being fixed to each of the strut fittings by the first fixation means.

This arrangement makes it possible to transmit the forces through symmetrical strut fittings of small dimensions, whose machining is simple and rapid. Furthermore, these independent strut fittings are lighter and thus easier to manipulate and mount on the strut.

The independence of the strut fittings makes it possible to channel the path of the forces from the attachment device to the wing or the fuselage, in a single principal direction. Thus a better division of forces is ensured. Each of the strut fittings is thus stressed in a balanced way, avoiding detrimental structural fatigue.

In the usual way, the engine strut generally comprises a lower spar as well. The first fixation means then advantageously comprise bolts connecting the intermediate fitting to the strut fittings through the lower spar.

Usually, the engine strut generally comprises two lateral panels as well. Preferably, these panels are then fixed respectively on the independent strut fittings by the second fixation means.

In a preferred embodiment of the invention, the intermediate fitting is fixed to two pairs of independent strut fittings by the first means of fixation.

Advantageously, in this preferred embodiment of the invention, the engine strut also comprises a rigidifying rib, placed between the two pairs of. independent strut fittings and fixed to the latter by the third means of fixation.

BRIEF DESCRIPTION OF THE DRAWINGS

Below, as an illustrative but non-limiting example, a preferred embodiment of the invention will be described, referring to the attached drawings, in which.

DETAILED DESCRIPTION OF A PREFERRED EMBODIMENT OF THE INVENTION

Figure 1:
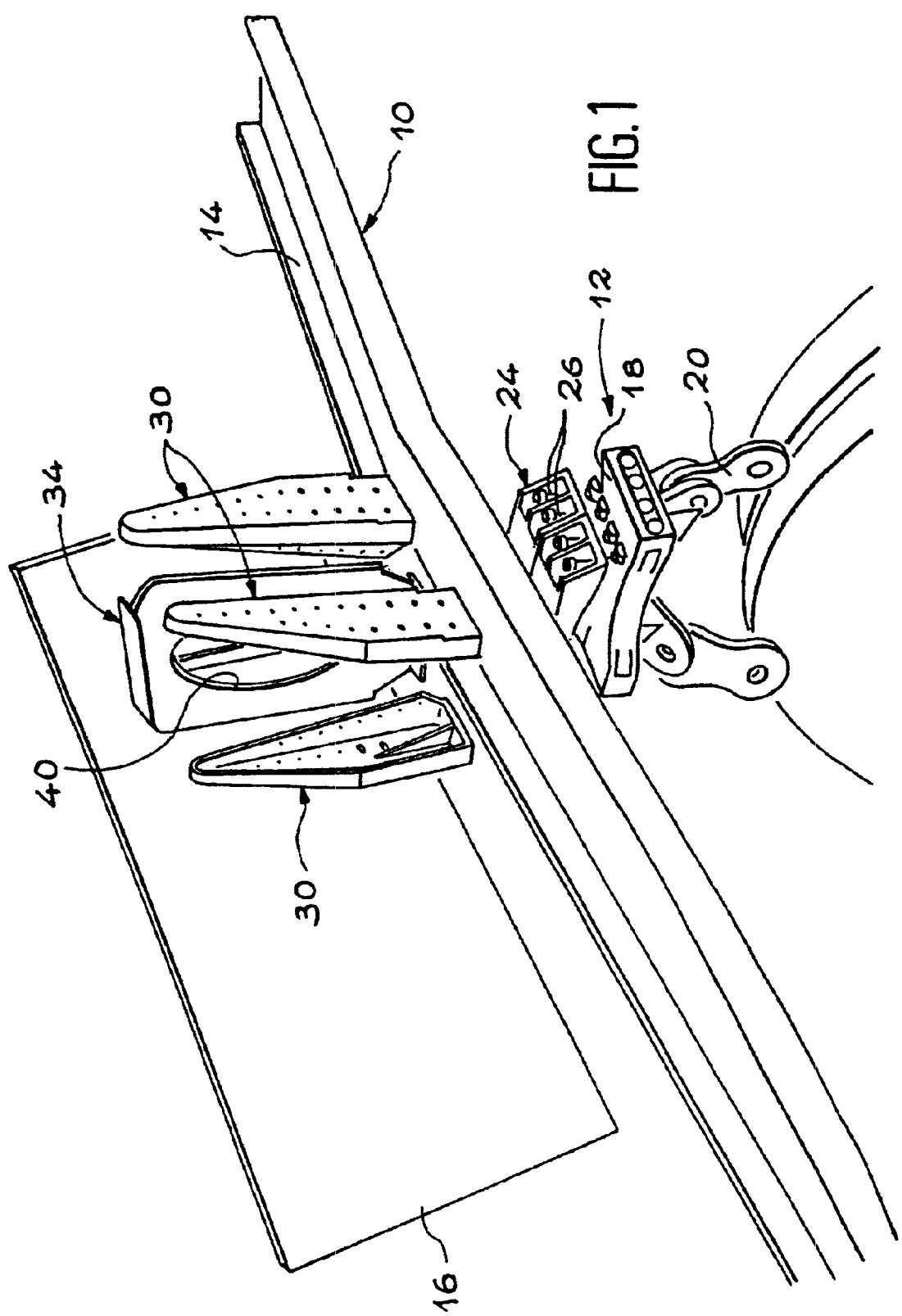
FIG. 1 is an exploded view in perspective showing a force recovery device according to the invention.

As shown schematically and deliberately incomplete in FIG. 1, a device for force recovery according to the invention comprises an engine strut 10 and an attachment device 12.

The engine strut 10 is provided to be fixed to a structural element of the aircraft, such as a wing or fuselage element. This fixation is ensured by means known in prior art, which are not part of the invention. In order to aid interpretation of FIG. 1. the upper part of engine strut 10 integrating its fixation means to the structure of the aircraft has deliberately been omitted.

More precisely, in FIG. 1 only the lower spar 14, a single one 16 of the two lateral panels and the parts of the engine strut 10 ensuring force recovery according to the invention are shown. These parts will be described in detail below.

The attachment device 12 serves as interface between the engine (not shown) of the aircraft and the engine strut 10. More precisely, in the embodiment shown as an example in the figures, it is designed to transmit the engine couple as well as the lateral and vertical forces (in the case of an engine suspended under the wing) relative to the longitudinal axis of the engine. Thus, the attachment device 12 is intended to be fixed to the engine by known means (not shown) and fixed to the engine strut 10 in a way to be described in detail below.

The structure and arrangement of the attachment device 12 are essentially classic. Thus, no detailed description is given.

In order to understand the invention fully, it should be noted that this device comprises a sole 18 as well as at least two ball pivoted rods 20, ensuring the attachment between the engine and the sole 18 according to circumferential directions relative to the engine. In the embodiment represented, the attachment device 12 also comprises two ball pivoted rods 20 linking the sole 18 to the engine according to directions oriented obliquely relative to the longitudinal axis of the engine.

The sole 18 of the attachment device 12 is fixed to the engine strut 10 by inserting an intermediate fitting 24. More precisely, the sole 18 is fixed to the intermediate fitting 24 by fixation means such as, for example, bolts 26.

The invention relates in particular to the case where the forces produced by the engine, for example because of its propulsive force and its mass, are higher than on most existing planes. For this reason, the size of the intermediate fitting 24 can be increased by doubling its dimensions, for example, relative to those of the intermediate fittings normally used, in order to obtain satisfactory rigidity. Consequently, it is preferable to use eight bolts 26.to fix the intermediate fitting 24 to the sole 18, instead of the usual four.

The intermediate fitting 24 is fixed to the engine strut 10 by fixation means such as bolts 28. In the case shown where the dimensions of the intermediate fitting 24 are doubled relative to those of a classic fitting of prior art, eight bolts 28 are used instead of the usual four.

Figure 2:
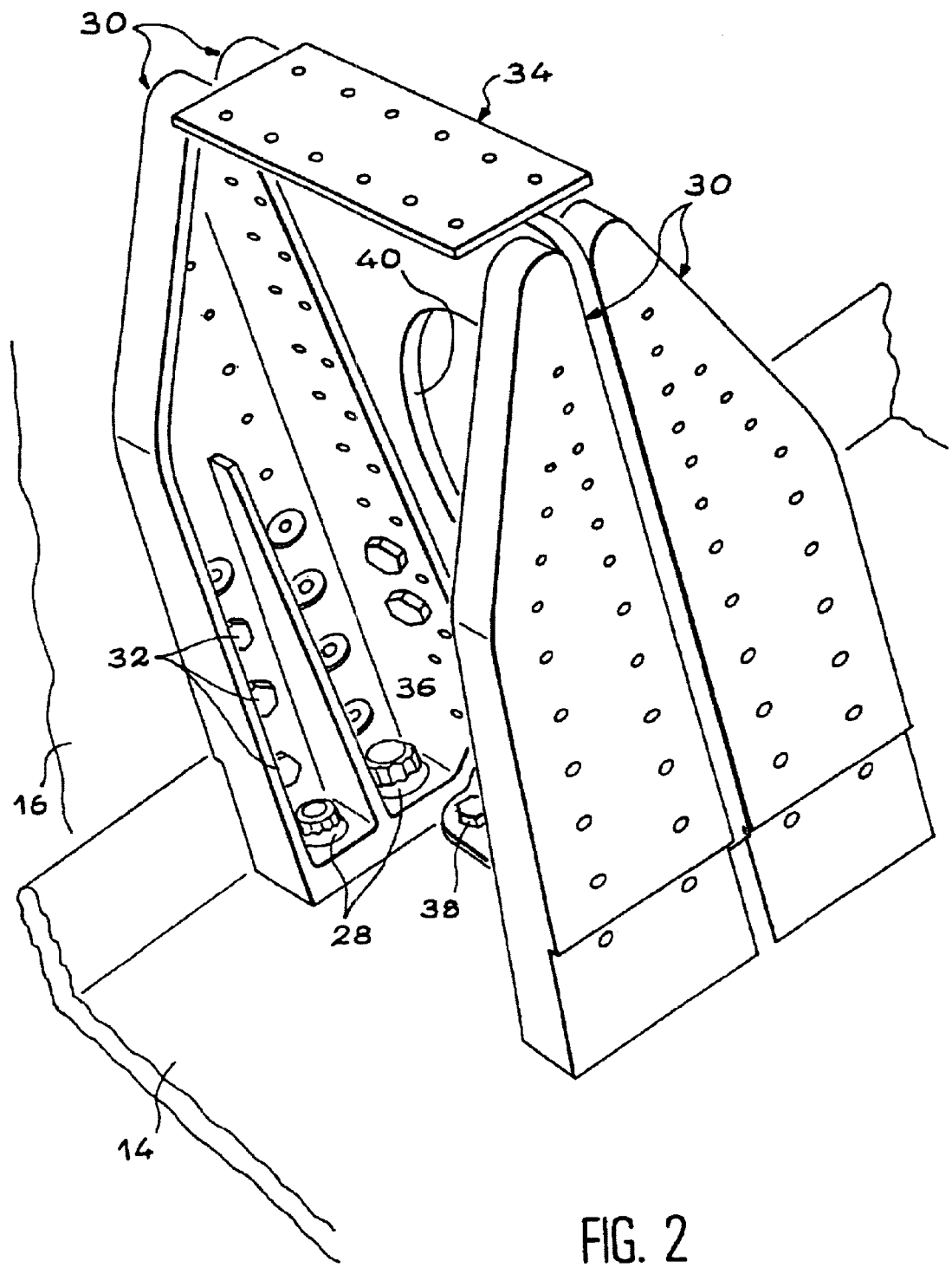
FIG. 2 is a view in perspective showing in more detail the lower part of a strut fitting used in the device of FIG. 1, together with the associated parts.

As shown clearly in FIGS. 1 and 2, the engine strut also comprises, according to the invention, independent strut fittings 30 ensuring that the forces are transmitted to the engine strut by the intermediate fitting 24.

More precisely, four independent strut fittings 30 are mounted above the lower spar 14, in the part where it overhangs the intermediate fitting 24. Thus, a pair of independent strut fittings 30. extend upwards from the lower spar 14, along each of the lateral panels 16 and within the latter.

The intermediate fitting 24 is fixed to each of the strut fittings 30 by two of the bolts 28, in such a way that each bolt 28 passes through aligned holes (not shown) formed for this purpose in the intermediate fitting 24, in the lower spar 14 and in the strut fitting 30.

Furthermore, fixation means such as bolts 32 pass through the aligned holes (not shown) formed in the strut fittings 30 and in the lateral panels 16. These bolts 32 integrate the independent strut fittings 30 with the lateral panels 16.

As shown in the figures, a support rib 34 is mounted between the two pairs of independent strut fittings 30, in such a way as to preserve the geometry of the strut. The support rib 34 does not transit any force. Therefore, it does not need to be rigid, nor dimensioned in function of the forces to be transmitted between the engine and the plane structure.

The rigidifying rib 34 is fixed to the independent strut fittings 30 by fixation means such as bolts 36. It is also fixed to the lower spar 14 of the engine strut 10 by fixation means such as bolts 38. Furthermore, the rigidifying rib 34 comprises, in known fashion, a central recess 40 to enable passage of cables, channelling or other, such as electric cables, within the engine strut 10.

In the arrangement described above, with reference to FIGS. 1 and 2, the bolts 26 make it possible to transit the forces generated by the engine to the intermediate fitting 24. These forces are then transmitted from the intermediate fitting 24 to the strut fittings 30 through the bolts 28. Finally, the thrusts mentioned above are transmitted from the strut fittings 30 to the lateral panels 16 by bolts 32.

Consequently, as opposed to classic devices for recovery of forces, the strut fittings 30 make it possible to transmit the forces following a privileged principal path direction. The major part of the forces thus transit through the strut fittings 30 and the bolts 32 to the lateral panels 16. On the contrary, only a small part of the forces transit to the rigidifying rib 34 through the bolts 36, which does not call into question the integrity of said rib, which is only present to rigidify the ensemble and is not dimensioned to transmit the forces.

Evidently, the invention is not limited to the embodiment which has been described above as an example. In particular, the bolts 26, 28, 32 and 36 can be replaced by any technically equivalent fixation means such as rivets, screws, etc. without going beyond the framework of the invention.

What is claimed is:

1. Device for recovering forces generated by an aircraft engine, comprising:

an engine strut able to be fixed to a structure of the aircraft; and at least one attachment device fixed to the engine strut and capable of supporting the engine, wherein the attachment device comprises an intermediate fitting fixed to the engine strut by first fixation means, in which the engine strut comprises, facing the attachment device, several strut fittings independent from each other, the intermediate fitting being fixed to each of the strut fittings by the first fixation means.

2. Device for recovering forces generated by an aircraft engine, comprising an engine strut able to be fixed to a structure of the aircraft and at least one attachment device fixed to the engine strut and capable of supporting the engine, the attachment device comprising an intermediate fitting fixed to the engine strut by first fixation means, in which the engine strut comprises, facing the attachment device, several strut fittings independent from each other, the intermediate fitting being fixed to each of the strut fittings by the first fixation means said engine strut furthermore comprises a lower spar, the first fixation means comprising bolts connected the intermediate fitting to the strut fittings through the lower spar.

3. Device according to claim 1, in which the engine strut also comprises two lateral panels, fixed respectively on the independent strut fittings by second fixation means.

4. Device according to claim 1, in which the intermediate fitting is fixed to two pairs of independent strut fittings by the first fixation means.

5. Device according to claim 4, in which the engine strut furthermore comprises a support rib, set between the two pairs of independent strut fittings and fixed to the latter by the third fixation means.

* * * * *